(12) United States Patent  
Shelley

(10) Patent No.: US 9,212,625 B2  
(45) Date of Patent: Dec. 15, 2015

(54) HYBRID GAS TURBINE PROPULSION SYSTEM

(71) Applicant: Rudolph Allen Shelley, Chicago, IL (US)

(72) Inventor: Rudolph Allen Shelley, Chicago, IL (US)

( * ) Notice: Subject to any disclaimer, the term of this patent is extended or adjusted under 35 U.S.C. 154(b) by 66 days.

(21) Appl. No.: 14/151,816

(22) Filed: Jan. 10, 2014

(65) Prior Publication Data

US 2015/0013306 A1 Jan. 15, 2015

Related U.S. Application Data

(63) Continuation-in-part of application No. 12/950,859, filed on Nov. 19, 2010, now abandoned.

(51) Int. Cl.

| | |
|---|---|
| F02K 5/00 | (2006.01) |
| F02C 3/32 | (2006.01) |
| B64D 27/10 | (2006.01) |
| B64D 27/12 | (2006.01) |
| B64D 27/14 | (2006.01) |
| F01D 15/10 | (2006.01) |
| F02K 3/06 | (2006.01) |
| F02C 7/32 | (2006.01) |
| B64D 31/04 | (2006.01) |
| B64D 27/02 | (2006.01) |

(52) U.S. Cl.
CPC . *F02K 5/00* (2013.01); *B64D 27/10* (2013.01); *B64D 27/12* (2013.01); *B64D 27/14* (2013.01); *B64D 31/04* (2013.01); *F01D 15/10* (2013.01); *F02C 7/32* (2013.01); *F02K 3/06* (2013.01); *B64D 2027/026* (2013.01); *F05D 2220/34* (2013.01); *Y02T 50/44* (2013.01); *Y02T 50/64* (2013.01)

(58) Field of Classification Search
CPC ............. F02K 5/00; F02K 5/026; F02K 7/10; F02K 7/16; F02K 3/06; F01D 15/10; F05D 2220/34
USPC ............. 416/54, 55; 60/398, 484; 290/44, 55; 244/53 R, 62
See application file for complete search history.

(56) References Cited

U.S. PATENT DOCUMENTS

| | | | | |
|---|---|---|---|---|
| 4,051,671 A | * | 10/1977 | Brewer | ........................... 60/262 |
| 5,281,094 A | * | 1/1994 | McCarty et al. | .............. 416/147 |
| 2008/0184906 A1 | * | 8/2008 | Kejha | ............................ 102/374 |

* cited by examiner

*Primary Examiner* — Igor Kershteyn  
*Assistant Examiner* — Jesse Prager

(57) ABSTRACT

A hybrid aerodynamic thrust system as a prime mover for aircraft or other high-speed vehicles. An arrangement of dual thrust resources to alternately accommodate low and high airspeed regimes. Electromotive force is used in lieu of hot section power turbines to achieve engine air compression or alternately perform thrust work at low velocities.

4 Claims, 2 Drawing Sheets

HYBRID GAS TURBINE PROPULSION SYSTEM

CROSS-REFERENCE TO RELATED APPLICATIONS

This is a continuation-in-part of application Ser. No. 12/950,859, filed Nov. 19, 2010, now abandoned. Related patents in prior art include:

| | | |
|---|---|---|
| 4,368,620 | Jan. 18, 1983 | Giles |
| 4,051,671 | Oct. 4, 1977 | Brewer |
| 3,678,306 | Jul. 18, 1972 | Garnier et al. |

BACKGROUND OF THE INVENTION

Inherent limitations to gas turbine power section rotating machinery vis-à-vis thermal stress inhibiting higher combustion temperatures and thus limiting fuel efficiency force designers to adopt complex mechanical interventions to achieve higher thrust potential, e.g., high-bypass turbofan disks, while leaving nearly half of the thermodynamic energy potential available from typical aviation fuels unexploited because burning them at their highest stoichiometric combustion temperatures would cause highly-stressed power turbine rotating machinery to fail. Inordinately high fuel consumption is also expended while aircraft are ground taxiing on main engine power, idling, or left at low-output settings such as when throttled back on descent-to-landing phases of aircraft operations. A solution to the thermal stress problem in gas turbine engines is still elusive and pertinent, given the cost of aviation jet fuel that is now impacting commercial airline financial solvency and air travel affordability, such that the adversely high low-power setting fuel consumption of said engines also needs to be solved.

In prior art devised to offset the limitation of thermal stresses subjected to hot section power turbine rotating machinery in turbojet/turbofan engines, the inventions of U.S. Pat. No. 3,678,306, to Garnier et al.; U.S. Pat. No. 4,051,671, to Brewer; and U.S. Pat. No. 4,368,620, to Giles, seem most relevant. In all said prior art, they did not address excessively high fuel consumption when powering a turbocompressor over extended periods at high altitudes using the devices they taught, given limitations to those devices taught while used in the stratosphere, or flexibility over a wide range of altitudes, or any means to ameliorate excessive fuel consumption when gas turbines as they taught are throttled back during descent and landing phases of a flight, or on the ground during taxiing maneuvers, when queuing for an active runway or idling after engine start.

Ram air turbines (RAT) as mentioned by Brewer and Giles are conventionally simple, small, retractable devices that lack the flexibility to contribute significantly to the creation of propulsion throughout a flight mission at varying altitudes, speeds and configurations. Further, Giles taught a windmill for ramjet engines, wherein the operative windstream is induced by ramjet engine jet exhaust within a closed system. Said art does not entertain powering the compressor work of a large main driver engine as used by commercial transport aircraft. No design feature was offered to improve fuel efficiency for said engines at various speeds and altitudes.

Conventional aviation turboshaft-powered auxiliary power units (APU) as mentioned in prior art, being generator sets as typically installed on jet aircraft of today, do not provide power levels sufficient to electrically drive the turbocompressors of the main turbojet/turbofan driver engines on any given size category of jet aircraft on which they are installed. If said APUs were logically scaled upward through the use of higher output turboshaft engines used by the APU to primarily support the powering of main engine turbocompressors, that would only mean that they would be replacing internal hot section power turbines in a conventional turbojet/turbofan main driver engine with a separate turboshaft engine that could might be more fuel efficient overall at low altitudes if the main driver jet engine—by freedom from hot turbines in said engine achieves lower thrust specific fuel consumption (TSFC) via combustion of air/fuel mixtures at higher flame temperatures—but would be a much less efficient proposition at higher altitudes due to contemporary turboshaft engine torque output limitations at stratospheric altitudes, as well as introducing another heat engine system component with its own intrinsic mechanical losses, and also suffering from the same thermal stress limitations that Brewer and Garnier proposed to overcome in main driver engines.

BRIEF SUMMARY OF THE INVENTION

The invention seeks to significantly lower fuel consumption. Higher responsiveness to sudden throttle inputs and modularity in components that can be isolated separately within an aircraft/vehicle structure for safety and weight/balance considerations, as well as avoidance of thermal stresses on post-combustion gas turbine rotating machinery, are the highlighted characteristics of the invention.

The invention may be visualized as being composed of four major component modules, i.e., a turbojet/turbofan thrust (TT) module, dual-function fan (DFF) module, auxiliary power unit (APU) module and stored energy (SE) module.

The use of this hybrid gas turbine propulsion system disclosed herein is not intended to be limited to aircraft, nor does the mention of 'turbocompressor', or examples thereof in drawings included herewith intend to limit the scope or type of compressors that may be used, because this disclosure is not for a type of compressor, but the manner and system by which the jet engine's turbocompressors are driven and thrust is variously produced.

BRIEF DESCRIPTION OF THE SEVERAL VIEWS OF DRAWINGS

Included in this disclosure are six drawings of the present invention, including some variations to the basic design. These drawings depict all essential elements of the device; however, they are not intended to limit the specific manner in which the invention is enjoined or installed with a given airframe/vehicular structure.

List of drawings herein:

DETAILED DESCRIPTION OF THE INVENTION

Figure 1:
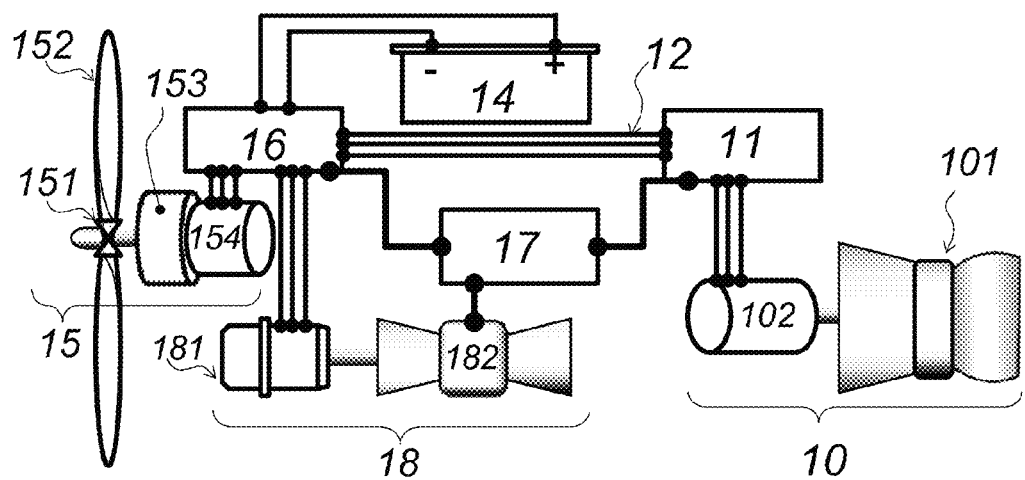
FIG. 1 is a schematic depiction of the invention's overall system with major modules.

In FIG. 1, the hybrid aerodynamic thrust system is schematically depicted, wherein, an aircraft at rest uses electrical energy from the SE module 14, to power aircraft electrical systems, as well as supply the APU module 18 with start-up current. Three-phase AC main bus current is expected in the preferred embodiment. A minimum electric current operating frequency should be the aviation standard 400 Hz for high-tension devices, or higher, to achieve practical size and weight specifications for the electric motors, motor/generators and stand-alone generators used within this invention. However, electrical system specifications regarding specific voltages, loadings or specific electric motor, generator or motor/generator unit designs are not the subject of this disclosure since existing art covers said design and construction adequately.

In a typical aircraft flight mission, after the APU 18 has been started, it can then drive the TT module turbocompressor(s) 102a, 102b and jet thrust thus becomes available. However, during ground taxiing operations, power can be alternately shunted to the DFF module 15 whereby it then provides ambient air forward or reverse thrust for 'push-back' of an aircraft, taxiing and braking thrust via its motor/generator unit 154 while operating in motor mode, with thrust varied by the electric current supplied to the DFF through variable frequency drive (VFD) motor speed circuitry 11, as well as by control of a variable-pitch constant speed hub 151 on which the DFF's propeller blades 152 are mounted.

The TT module 10 is a modified Brayton-cycle jet thrust engine comprised of an enclosed duct with or without an integral bypass fan 50, 61, and containing one or more turbocompressor stages in one or more spools 42, 43 driven by high capacity, VFD controlled, variable speed electric motors 102a, 102b followed by a combustor stage 44, which has static, high-temperature resistant refractory ceramic or other material linings 48a, 48b mounted stationarily along the combustor area walls and center body downstream for a sufficient distance to protect internal parts from combustion at as high as 2000° C. in adiabatic flame temperatures on stoichiometric air/fuel mixtures downstream of the ignition point, thus capable of an over 40 percent reduction in TSFC versus conventional aviation turbofans of today, based on theoretical improvements in the release of heat energy.

Figure 4:
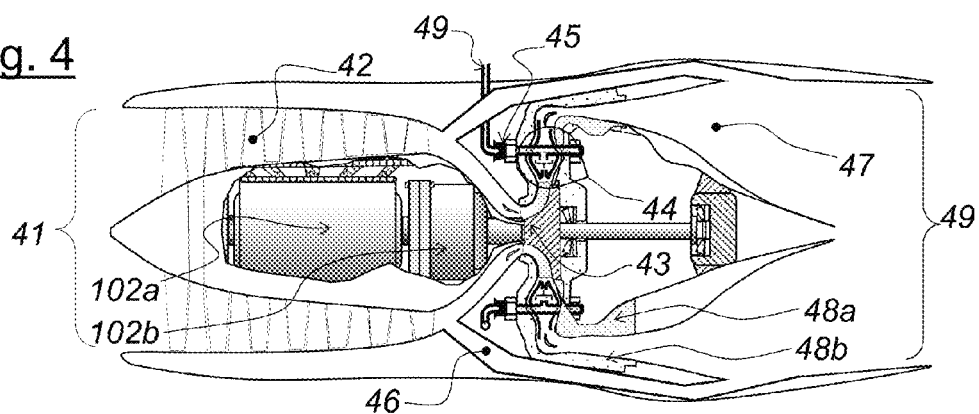
FIG. 4 is a depiction of the invention's main jet thrust module.

In FIG. 4, TT module 10 operates by air being drawn into the module at the inlet area 41 by the turbocompressor(s) 42, 43 that perform compression work on an air mass that should have a design output exceeding stoichiometric air/fuel mixture needs, such that said excess be partially bled off via an inter-stage compressed air bypass manifold 46 after or between compressor stage(s) 42, 43 prior to entering the combustor stage 44, or have some air passing through the combustor stage segregated by guide vanes from fuel injected into the air stream via fuel manifold 45, thus combusted fuel/air mixtures be later mixed with air from the bypass manifold 46 well downstream of the ignition point, beyond protective refractory material liners 48a, 48b in order that the transfer of heat energy is maximized by mixing with relatively cool air downstream of the combustor within the jet exhaust expansion duct 47, but before the exit nozzle 49, thus augmenting TT module thrust. The fuel manifold 45 injects fuel into the passing compressed air sufficient to achieve stoichiometric mixtures. Upon ignition, the gas expansion duct 47 facilitates the conversion of combusted gas heat energy into pressure energy as the jet exhaust moves aft through that duct area of increasing cross-section within the annular space thereof prior to exiting at the rearmost nozzle 49. As such, in TT module 10, electrically-powered compressors capable of variable speeds and torque determined by pilot throttle inputs can be spun up quicker than compressors driven by hot section turbines as in conventional turbojet/turbofan engines, given the near instantaneous engine response possible with electric motors without having to maintain high fuel flows at low throttle settings, such that fuel may be injected only as needed to induce specific thrust output, and not be needed to maintain turbocompressor 42, 43 rpm.

The onset of any compressor stall can also be intervened into easily since compressor rotational speed and other indicators can be detected and moderated to electrically ameliorate any loss of jet engine power by preemptively reducing compressor spool rpm and returning to the inlet turbocompressor 42 to functional throughput via control of the driving electric motor(s) 102a, 102b. Bypass fans 50, 61 as in FIG. 5 and FIG. 6 may be added to the above basic configuration.

Figure 5:
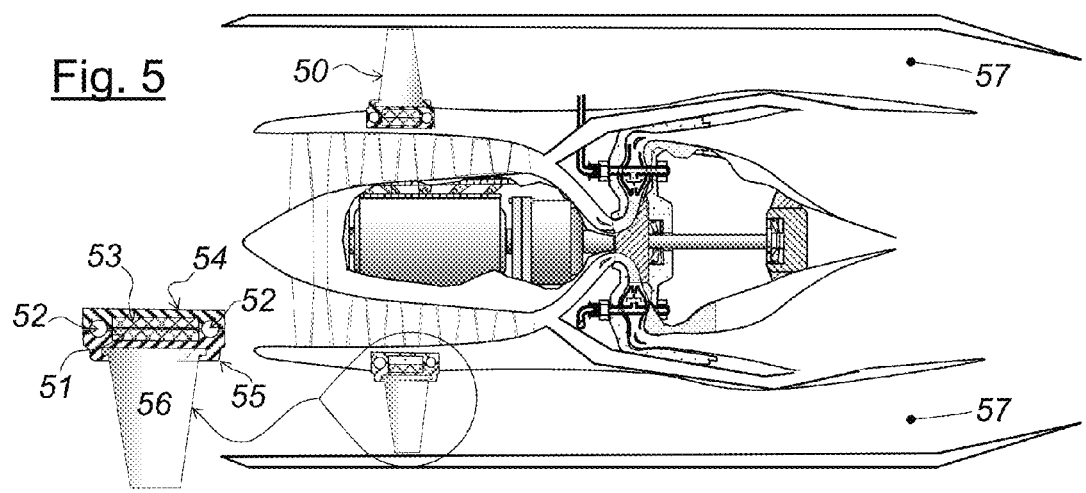
FIG. 5 depicts a variation of the TT module with an electrically-powered annular bypass fan.
Figure 6:
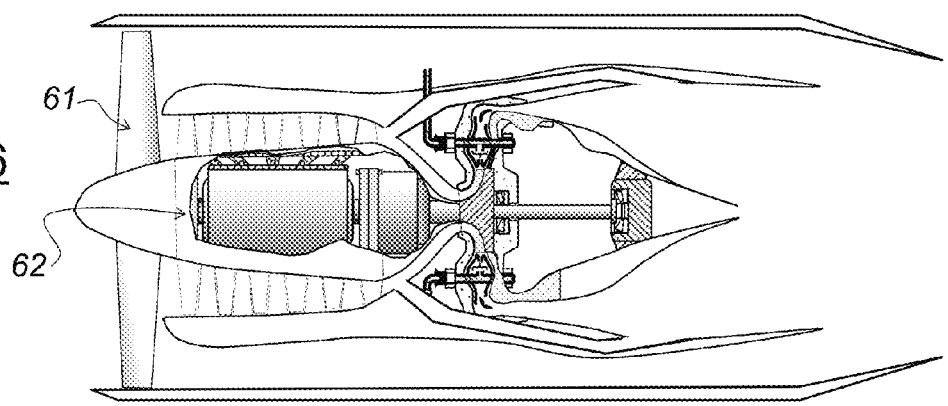
FIG. 6 depicts a variation of the TT module with an electrically-powered axial bypass fan.

FIG. 5 depicts an electrically-powered annular bypass fan 50, wherein the stationary race 54 of this ring-shaped motor is constructed to serve as the electric motor stator with embedded magnets or windings 53, while a free-spinning race 55 acts as the rotor with embedded rotor magnets 51; these races being separated by bearings 52 and an air gap. This arrangement achieves higher torque than a conventional motor positioned within the center body 61 turning a central shaft at the axis of the TT module because of the wider circumferential displacement of stator magnets 53 and rotor magnets 51 relative to the driven fan blades 56. It also eliminates the less productive inner portion of a bypass fan swept disk as in a more conventional, axially-driven bypass fan 61, FIG. 6, thus directing power input more efficiently to bypass flow via duct 57. During the takeoff roll of an aircraft, power being generated by the DFF 15 in generator mode as it spins up with increasing forward velocity should be shunted to the bypass fan to augment takeoff thrust, while the APU powers the TT module compressors.

Figure 3:
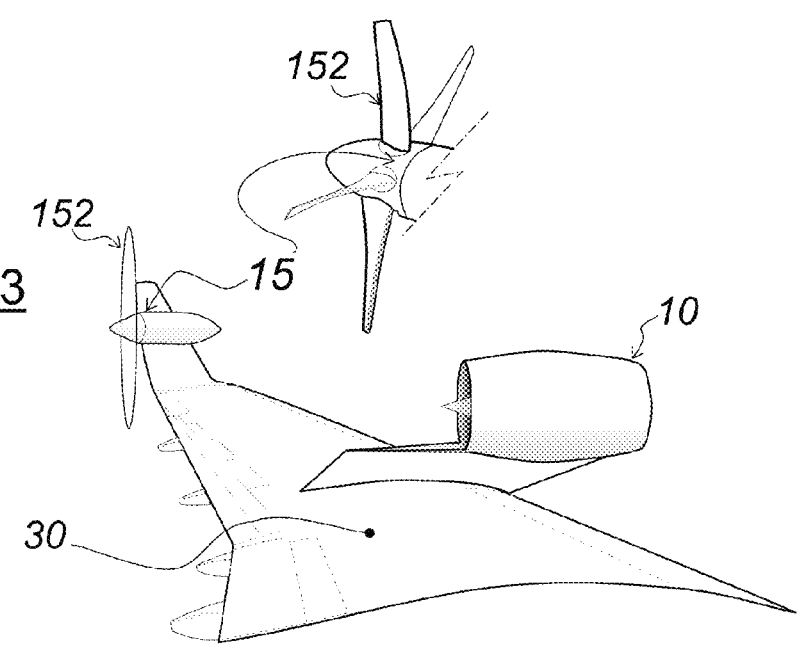
FIG. 3 shows a winglet DFF module mounting configuration and an overwing TT module.

The DFF module 15 as depicted in FIG. 3, has propeller blades exposed to the relative wind airstream of an aircraft/vehicle in motion. FIG. 3 also shows possible mounting positions for the DFF module 15 and TT module 10 on a wing 30, but such depiction is not intended to limit the manner of their installation. When the motor/generator unit 154 is switched to generator mode, the constant-speed, variable pitch propeller hub 151 pitch setting is adjusted to an incidence angle conducive to wind turbine work and there is a relative wind of sufficient velocity, the motor/generator 154 produces electric power via the power supply conditioner unit 16 to drive the turbocompressor motor(s) 102a, 102b; said conditions would exist during the climb, cruise and descent phases of a flight, thus the APU is needed to power the TT module turbocompressors 42, 43 only during startup at rest, takeoff and early climb phases. When the motor/generator unit is switched to motor mode and the propeller hub 151 pitch setting is adjusted to an incidence angle conducive to propeller thrust work, the DFF 15 then produces either forward or reverse thrust, depending on the propeller incidence angle, thus being usable for emergency forward thrust due to any sudden loss of TT module thrust (e.g., foreign matter ingestion, bird strikes, etc.), or for ground maneuvering or aerodynamic braking upon landing. A step-up gearbox 153 increasing rpm into DFF motor/generator unit 154 is needed.

The APU module 18 has two main components, i.e., the driving engine 182, a gas turboshaft engine in the preferred embodiment, plus one or more alternator units 181 supplying power via 3-phase conduit cables 12, along with the associated engine control circuitry within a FADEC unit 17 as is common to aviation technology. Optionally, more than one alternator unit coupled to the driving engine would permit widely disparaged dual-range outputs, where either a low or high capacity alternator may be separately engaged to, or disengaged from, the driving engine by clutch couplings to provide a means of producing significantly lower output current levels at relatively low driving engine power output settings (such as during taxiing or aircraft high-altitude cruise), or achieve maximum output ratings with a larger generator. This dual-range feature can also be achieved to some extent with conventional electronic control of alternator output. Solar power cells affixed to the external surface of the airframe/vehicular structure may optionally supplement APU power.

A stored energy module 14 containing conventional electric storage batteries provides supplementary power for aircraft and engine ancillary systems. Electrochemical fuel cells, or a combination of batteries and electrochemical fuel cells that can be recharged by external facilities prior to, or after, flight/vehicle operations is also acceptable as an SE module.

Figure 2:
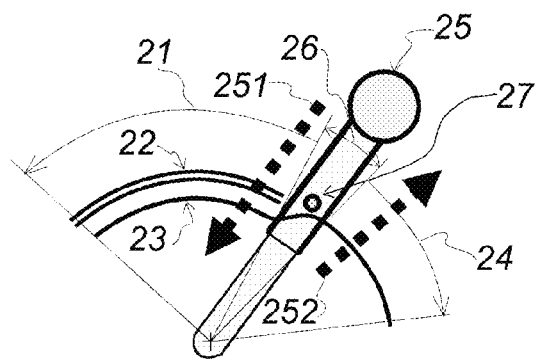
FIG. 2 depicts a method of single lever thrust control for this hybrid engine system.

Given the complex interdependence of this invention's thrust modules, a simple arrangement of control is seen as necessary to practical use and is depicted in FIG. 2 using a single power lever 25 as typical to conventional aircraft power control quadrants. TT module forward thrust is enacted by direct forward movement of the control lever through deflection arc 21, while reverse thrust via the DFF module 15 is actuated by a rearward pull on the spring-loaded lever 25 with a slight upward lift 252 on the handle for track follower cam 27 to overcome a safety detent caused by a slightly elevated rearward motion track into deflection arc 24. Actuation of forward DFF module thrust requires downward pressure 251 on the spring-loaded thrust lever 25 as it is moved forward into deflection arc 21, thus selecting the lower track 23 governing DFF positive thrust; forward deflection into deflection arc 21 without a downward depression otherwise follows upper the power lever track 22 for TT module thrust priority. Power lever deflections resulting in differing configuration must first pass through a region of idle settings for both the TT and DFF modules within arc 26 to prevent an inadvertent sudden changes during transition. By said single control lever deflections operating on electrical control circuitry contacts or FADEC 17 sensors, basic control parameters and pilot-controlled limits to this hybrid gas turbine propulsion system are defined, including which thrust engine is in use; associated settings in electric motor speed variations are directly—or indirectly via FADEC circuitry—set relative to control lever deflection; the DFF mode—switching between motor or generator—as well as DFF propeller pitch, are also determined. APU status—off, on and idling, reduced or full outputs—as well as SE module input/output bus control, must be set manually, as is normal in aviation operations.

Since the thrust required for ground taxiing is a relatively small value compared to that during flight, use of the DFF 15 as the motive force on the ground for slow speed maneuvering for is a more economical approach than using main driver engines, especially where the APU 18 electric power output can be moderated to low settings and frugal fuel flows, or an SE module has sufficient power reserve to handle said maneuvers. For the takeoff roll, however, power is shunted from the APU module 18 to the TT module 10 and the aircraft accelerates on that thrust. During takeoff roll acceleration, the DFF—set to generator mode—begins to spin in the relative wind, which at typical jet aircraft takeoff 'rotation' speeds—generally 110-130 knots—would make it capable of imparting significant current to the hybrid propulsion system's electric grid, adding energy suppliable to a TT module bypass fan 56, 61 and/or turbocompressor 42, 43 work, and/or stored by the SE module 14. If the takeoff were aborted due to an output problem with the TT module 10, e.g., due to ingestion of foreign matter or bird strikes, the DFF would supply emergency thrust with power from the APU 18 and SE 14 modules to safely stay aloft within an airport pattern or terminal control area (TCA) and return to landing, or safely reach a more distant location. During a normal takeoff/climb phase, the APU module is needed to assist thrust work only until a relative wind of around 250 knots is reached at or below 10,000 feet ISA (per regulatory civil aircraft airspeed limitation), wherein the DFF 15 thereafter is switched to generator mode to supply the full electric load needed by the TT turbocompressor motors 102a, 102b and optionally, a bypass fan 56, 61. DFF blade pitch can then be gradually minimized as forward speed increases to ameliorate excessively high blade tip speeds, because while acting as a wind turbine said propeller can continue to extract high torque from the relative windstream at low propeller blade tip speeds. At the start of the descent phase, wherein transport aircraft typically enter into a state of powered glide down into a TCA during which the need for jet thrust is low, infrequent and minimal, the TT fuel flow is then reduced, expending only minute fuel flows to warm TT module internal parts—thus ameliorating a 'cold soak' problem in case of sudden demand for jet thrust—or the fuel flow or the TT module can be completely cut off.

Commercial air transport safety standards as currently mandated require an APU to be restarted if shutdown during cruise as a precaution against inflight emergencies during approach to landing. As such, the APU module 18 must in any case also be started; thereafter, both the DFF and TT modules, depending on the airspeed, can then supply forward thrust as required during an approach to landing. On the final approach, the DFF 15 in generator mode can be used as airborne aerodynamic braking device caused by induced drag on DFF blades 152 in performing work as a wind turbine at high pitch settings via hub 151, said drag being variable by blade pitch. Conventional aerodynamic braking on aircraft is normally a manual setting separate from the power lever. At aircraft touchdown, the DFF—operating as a thrust engine with power from the APU and/or SE modules—can then supply reverse thrust for landing roll braking via reverse pitch settings of the variable pitch hub 151 during rollout, as well as provide forward thrust for taxiing to the ramp area. As described above, the TFSC for this invention is theoretically significantly lower throughout all phases of a flight operation.

It is important to realize that the power outputs required to run the turbocompressors of turbojet/turbofan engines alone at their full rated static thrust at sea level, as required for jet transport aircraft, and the power required to only maintain minimum safe, level flight for the entire airframe, are values that are compatible. This is not a direct energy relationship as established by fluid dynamics or a thermodynamic relativity, but happenstance due to regulatory controls over aircraft design and performance that have import to engine size, their operating parameters as well as the low speed capabilities of airframes.

Using an example from regional jet aircraft with turbofan engines of 15,000-44,000 lbs. total static thrust, typically, and 53,000-128,000 lb. maximum takeoff weights (MTOW), it can be demonstrated that the power output required to maintain minimum safe, level flight (defined within the aviation industry as ~1.3× of a given aircraft's stall speed) by one such representative aircraft, and the power to operate a jet engine's turbocompressors alone at full static thrust, are compatible values, meaning that if a separate source of energy exists to power a jet engine's compressors at full static thrust, that source is also at least sufficient to maintain minimum safe level flight, if directed to some other medium of thrust. A large turboshaft engine used only at low altitudes is a relatively compact, cost effective and fuel efficient choice for this.

Using the equation for aerodynamic drag—

$$F_D = \tfrac{1}{2}\rho v^2 C_D A \qquad \text{Equation 1}$$

and inputting values for a representative aircraft as in use today, such as a 90+ passenger regional jet with a 92,000 lb. MTOW and maximum static thrust from both its two turbofan engines of 48,000 lbs. at sea level, when inserting a value for the drag-related area and a coefficient to include compensation for various other drag components relative to a configuration with landing gear and initial flaps down, that at an altitude of 5,000 feet international standard atmosphere (ISA), airspeed of 128 knots (217 ft./sec.)—minimum 'low and slow' level flight for said aircraft—a net thrust equivalent to approximately 8,000 lbs. is needed to maintain that condition, which by the equation—

$$\text{Horsepower} = \text{jet thrust} \ast \text{velocity}/550 \qquad \text{Equation 2}$$

is equivalent to approximately 3,200 net horsepower.

By the same equation 1, above, based on data for that representative aircraft and its two turbofan engines having a total of 48,000 lbs. static thrust at sea level, inserting values for a clean configuration cruise at 452 knots (764.4 ft./sec., ~Mach 0.78), including early transonic compressibility, at an altitude of 35,000 feet ISA, yields a total net thrust requirement of approximately 14,900 lbs., which compares closely with the actual combined engine performance data at cruise of the representative aircraft engines when at 35,000 feet ISA and Mach 0.78.

Turbocompressor power input required to perform the compression work within a gas turbine engine varies quite widely with individual compressor design, including such factors as the total air mass flow throughput, type of compressor, number of stages, internal losses within the engine's rotating machinery, etc. It can be approximated, however, that the compression work in a Brayton-cycle gas turbine (not including that power used to power a bypass turbofan) shall cost approximately 20 percent engine's net energy output, or thus account for about 3,200 lbs. thrust at 35,000 feet and Mach 0.78 that is being lost from the above engine's gross output. This then, by the power equivalency equation 2 results in a total turbocompressor input requirement of around 4,400 horsepower at said conditions. However, a load premium would exist for the TT module 10 to produce thrust equivalent to the representative turbofan engine being compared here, because a turbojet-type TT module would have to have a larger compressor air mass flow than the core flow of the representative turbofan engine to achieve equivalent thrust that includes a large bypass flow. A factor of approximately 1.21× is then required to perform the compressor workload, based on the product of the industry-demonstrated performance relation between turbojet cores with and without bypass fans on gas turbine engines, and the near linear increase in thermodynamic efficiency at 2000° C. flame temperatures for the TT module versus a maximum of around 1100° C. common in civil aviation gas turbine engines—nearly doubling the thermodynamic energy release—to compensate for the representative engine's smaller core mass flow, where the representative conventional turbofan and a TT module are assumed to have the same compressor efficiencies and a near-linear increase in the compression workload consequent to a larger mass flow for the TT module, disregarding a less restrictive jet exhaust duct, equals a TT module power input requirement of ~5,300 horsepower at 35,000 feet ISA and Mach 0.78.

Likewise to the above comparison, for static thrust at sea level, based on said representative engine data, approximately 8,300 horsepower must be input to the TT module 10 at the beginning of the takeoff roll, which must be sourced from the APU and/or SE modules for short periods—i.e., 10-15 minutes from brake release to climb passing through 10,000 feet in altitude—being the highest rating that would be required of the APU module alone in this example, versus the 3,200 horsepower needed to maintain safe, level flight at 5,000 feet ISA, but, by aviation conventions, perhaps 1.5× of that is needed—4,800 horsepower—to achieve safe climb performance under emergency conditions. Excess APU output under said conditions increases safety margins.

The theoretical maximum power potential of a single wind turbine at 35,000 feet ISA and Mach 0.78 operating on a 2.5-meter diameter swept disk, is given by the equation—

$$\text{Output} = kC_P 0.5 \rho A V^3 \qquad \text{Equation 3}$$

wherein it is derived to be ~10,200 horsepower (7,600 kilowatts). Finer pitch settings of the DFF blades 152 would thus be used to extract only ~5,300 horsepower at 35,000 feet ISA, as in paragraph 0028, to do the required TT module 10 compression work. Excess electric current available from the DFF module 15 could be applied to powering an optional annular or axial bypass fan, where said flows could be advantageously mixed with TT module core flows to achieve the highest TFSC. Extracting excess energy would induce inordinately high drag.

Similarly to the above examples, a 2.5-meter diameter swept disk would produce a practical maximum of ~6,700 horsepower @10,000 feet ISA at a forward velocity of 250 knots, versus an input required to the TT module turbocompressor(s) 42, 43 of about 7,700 horsepower, based on the representative turbofan engine thrust output at 90% power (compressor rpm at climb configuration power settings) at that altitude, thus a deficit would exist toward the total power needed from the DFF 15, requiring the APU and/or SE module(s) to service the TT module 10 slightly longer into the climb to ~11,000 feet ISA to achieve DFF/TT power supply/demand equilibrium at ~280 knots, or the invention's installation in said example would require a slightly larger (2.68-meter diameter) swept disk to achieve transition at 10,000 feet. The above calculations are based on a single DFF module supplying the electrical load requirements for TT module(s) producing the same thrust as the two representative turbofan engines. If two DFF modules 15 were used, the swept disk area of their propeller blades 152 and/or induced drag on them due to pitch angles could then be reduced. It should also be noted that an aircraft powered by jet engines of minimal size such that there is a low thrust to weight ratio for said aircraft would then tend to have a smaller turbocompressor power demand and thus any APU module 18 supporting only such smaller demand would then have a smaller power reserve relative to DFF thrust work.

I claim:

1. A hybrid gas turbine propulsion system comprising:
    a turbojet thrust module being a modified Brayton-cycle jet thrust engine comprised of an enclosing duct having an inlet and a center body for one or more turbocompressors of axial or centrifugal type in one or more stages driven by variable frequency drive (VFD) controlled, variable speed electric motors, followed by a combustor stage where fuel is mixed with air compressed by the one or more turbocompressors then ignited and combusted via a fuel manifold sufficient to achieve stoichiometric mixtures creating a jet exhaust entering a gas expansion duct of increasing cross-section lined with high-temperature resistant refractory ceramic or other high temperature resistant linings mounted stationarily along the combustor and expansion duct walls within an annular space defined by the center body and expansion duct, thereafter the jet exhaust exiting at a rearmost exit nozzle as a first propulsive thrust device;

an externally mounted dual-function fan module, not axially co-located with the turbojet engine, being a plurality of airfoil blades mounted on a variable pitch propeller hub of constant-speed type, comprising a mounting for such blades extending in a radial direction, such that when the dual-function fan is exposed to a sufficient relative wind, the dual-function fan autorotates, resulting in a driving torque being applied to an electric motor/generator, and when acting as a generator, then generates an electric power output via power supply conditioning, control and motor speed circuitry to feed electric motors that turn the one or more turbocompressors, or with adjustments to the dual-function fan blade pitch at the hub and input of torque from the electric motor/generator acting as a motor, such motor deriving electric power from an external source, that motor applies torque to the adjustable pitch hub thus borne onto the dual-function fan blades as a second propulsive thrust device producing either forward or reverse thrust via changes in blade pitch as selected in operational use;

an auxiliary power unit module having a turboshaft engine in the preferred embodiment, or other internal combustion engine, mechanically driving an electric generator having an output of which is sufficient to power the electric motors of the one of more turbocompressors toward achieving the full intended maximum propulsive thrust of that engine as a first propulsive thrust device while an aircraft or other vehicle so equipped is static at rest or has a low forward velocity, or when such electric power is otherwise shunted into the dual-function fan module above, the electric motor/generator of that module, acting as a motor, turns the dual-function fan as a second propulsive thrust device; and, a stored energy module containing electricity storage batteries providing supplementary power for engine ancillary systems.

2. The hybrid gas turbine propulsion system according to claim 1, wherein the turbojet engine having an aerodynamic fan with a plurality of blades, electrically-driven by either the dual-function fan module or the auxiliary power unit module, causing such fan to operate on ambient air forced through a circumferentially co-axial passage around the turbojet thrust engine as an air flow bypassing the turbocompressor and combustor stages of such engine, that bypass flow of which absorbs some of the heat energy from the turbojet thrust engine exhaust flow when mixed with it, adding to the total thrust of the turbojet thrust engine.

3. A method for improving thermodynamic efficiency in the hybrid gas turbine propulsion system of claim 1, comprising reducing flow constrictions after the combustor stage created by mechanical components within said engines inhibiting a jet exhaust flow through the expansion duct to the exit nozzle, and permitting the highest stoichiometric fuel/air mixture combustion and post-combustion exhaust temperatures to be sustained via the elimination of hot section turbines in such engines that are susceptible to high-temperature heat stress and high rotating part centrifugal strain.

4. The hybrid gas turbine propulsion system according to claim 1, wherein sufficient propulsive force is provided for safe operation after failure of one propulsive thrust device during operation by relying then on the still functioning propulsive thrust device.

\* \* \* \* \*